(12) United States Patent
Becker

(10) Patent No.: US 7,672,919 B2
(45) Date of Patent: Mar. 2, 2010

(54) DETERMINATION OF GRAPH CONNECTIVITY METRICS USING BIT-VECTORS

(75) Inventor: Glenn C. Becker, Alexandria, VA (US)

(73) Assignee: Unisys Corporation, Blue Bell, PA (US)

( * ) Notice: Subject to any disclaimer, the term of this patent is extended or adjusted under 35 U.S.C. 154(b) by 695 days.

(21) Appl. No.: 11/498,024

(22) Filed: Aug. 2, 2006

(65) Prior Publication Data

US 2008/0034074 A1   Feb. 7, 2008

(51) Int. Cl.
  G06F 15/18   (2006.01)
  G06E 3/00   (2006.01)
  G06G 7/00   (2006.01)
(52) U.S. Cl. ...................................... 706/26
(58) Field of Classification Search .................. 706/26
  See application file for complete search history.

(56) References Cited

U.S. PATENT DOCUMENTS 6,314,093 B1   11/2001  Mann et al.

OTHER PUBLICATIONS

D. Burago, D. Grigoriev, and A. Slissenko "Approximating shortest path for the skew lines problem in time doubly logarithmic in 1/epsilon" Elsevier. Theoretical Computer Science. 2004.*
M. Girvan and M E. J. Newman "Community structure in social and biological networks" PNAS vol. 99, No. 12 Jun. 11, 2002.*
Steffen Beyer. Module "Bit::Vector" ICA, Sep. 22-24, 2000.*
Schaller, M.: "Reclustering of high energy physics data", Scientific and Statistical Database Management, 1999. Eleventh International Conference on Cleveland, OH,USA Jul. 28-30, 1999, Los Alamitos, CA, USA, IEEE Comput. Soc, US, Jul. 28, 1999, pp. 194-203, XP010348722, ISBN: 0-7695-0046-3, abstract, sections 1, 2, 2.1, 2.3.
M.E.J. Newman: "Who is the best connected scientist? A study of scientific coauthorship networks" 2004,pp. 1-32, XP002474897, Department of Physics and Center for the Study of Complex Systems,University of Michigan,Retrieved from the Internet: URL:http://www-personal.umich.edu/{mejn/papers/cnlspre.pdf> cited in the application, sections 3.6, 4.1 to 4.3.
Weiwei Mao et al: "Correlation-reduced scan-path design to improve delay fault coverage" Proceedings of the ACM/IEEE Design Automation Conference. San Francisco, Jun. 17-21, 1991, Proceedings of the ACM/IEEE Design Automation Conference (DAC), New York, IEEE, US, vol. Conf. 28, Jun. 17, 1991, pp. 73-79, XP010575294, ISBN:0-89791-395-7, sections 3.2, 3.3.
Reka Albert, Albert-Laszlo Barabasi: "Statistical Mechanics of Complex Networks", Arxiv:Cond-Mat/0106096 V1, Jun. 6, 2001, pp. 1-54, XP002474898, cited in the application sections III, V, VI.

(Continued)

*Primary Examiner*—David R Vincent
*Assistant Examiner*—Ben M Rifkin
(74) *Attorney, Agent, or Firm*—James E. Goepel; Richard J. Gregson; Radar, Fishman & Grauer

(57) ABSTRACT

Determination of a connectivity-metrics for graphs representative of networks of interest. A graph that represents a network of interest is accessed. The graph includes nodes representing points in the network of interest, and edges corresponding to the nodes. Bit-vectors are generated corresponding to the nodes and/or edges, wherein individual bits in the bit-vectors respectively provide a logical indication of connectedness. The connectivity-metric is then determined by applying a logical bit operation to the plurality of bit-vectors. Examples of connectivity metrics include a connected components, shortest paths, betweenness, clustering, and tree-based determinations.

14 Claims, 16 Drawing Sheets

| Node | $v[\ ]_1$ | $v[\ ]_2$ |
|---|---|---|
| 1 | 1110000 | 1111100 |
| 2 | 1101000 | 1111100 |
| 3 | 1010100 | 1111100 |
| 4 | 0101100 | 1111100 |
| 5 | 0011100 | 1111100 |
| 6 | 0000011 | 0000011 |
| 7 | 0000011 | 0000011 |

OTHER PUBLICATIONS

Newman, M.E.J., "Models of the Small World, A Review," Santa Fe Institute, 1399 Hyde Park Road, Santa Fe, NM 87501, pp. 1-9 (May 9, 2006).

Albert, R. and Barabasi, A., "Statistical Mechanics of Complext Networks," Reviews of Modern Physics, vol. 74, No. 1, pp. 47-97 (Jan. 2002).

* cited by examiner

| Node | $v[]_7$ |
|---|---|
| 1 | 1110000 |
| 2 | 1101000 |
| 3 | 1010100 |
| 4 | 0101100 |
| 5 | 0011100 |
| 6 | 0000011 |
| 7 | 0000011 |

FIG. 6

| Edge | e[]$_1$ | e[]$_2$ | e[]$_3$ | e[]$_4$ |
|---|---|---|---|---|
| a | 110000 | 111101 | 111111 | 111111 |
| b | 010100 | 110110 | 111111 | 111111 |
| c | 000110 | 011110 | 111110 | 111111 |
| d | 001010 | 101110 | 111111 | 111111 |
| e | 101000 | 111011 | 111111 | 111111 |
| f | 100001 | 111001 | 111111 | 111111 |

| Node | $v[]_i$ |
|---|---|
| 1 | 1100000 |
| 2 | 1110010 |
| 3 | 0111110 |
| 4 | 0011100 |
| 5 | 0011101 |
| 6 | 0110010 |
| 7 | 0000101 |

| Node | $v[\,]_1$ | $v[\,]_2$ |
|---|---|---|
| 1 | 10001010 | 11001011 |
| 2 | 01011100 | 11111100 |
| 3 | 00100101 | 01100111 |
| 4 | 01011100 | 11111100 |
| 5 | 11001000 | 11011110 |
| 6 | 01100100 | 01111110 |
| 7 | 10000011 | 10101011 |
| 8 | 00100011 | 11100111 |

FIG. 15

DETERMINATION OF GRAPH CONNECTIVITY METRICS USING BIT-VECTORS

BACKGROUND OF THE INVENTION

1. Field of the Invention

This invention relates generally to graph analysis and more particularly to bit-vector algorithms for graph processing.

2. Description of the Related Art

Graph analysis plays a critical role in data mining that involves transactional activity, social networks, and communications. Much of this analysis uses connectivity-metrics such as betweenness and closeness to characterize highly connected nodes, intermediaries, or hubs of activity. Calculating these metrics requires finding such graph properties as connected components or shortest paths. The processing required to find all connected components or shortest paths for a large graph is very expensive, making real-time (interactive) analysis infeasible.

One connectivity-metric is referred to as "connected components", which may be determined using recursive functions in conventional systems. An unrestricted recursive process commences by setting all of the nodes in a graph to UNVISITED, and selecting any UNVISITED node as a starting point. The selected node is then marked as VISITED and a depth-first search of all connected nodes that are also UNVISITED is performed, marking each node encountered in the search as VISITED. This searching is continued until no more UNVISITED nodes can be found in this component. The next component's starting point is found by searching the graph for remaining UNVISITED node(s). The process is then repeated until all nodes in the graph are marked VISITED. The depth-first search is implemented as a recursive function. This implementation runs very quickly but may cause a stack overflow if the graph is too large.

An alternative implementation of the unrestricted recursive algorithm is one that restricts the recursive depth to avoid stack overflow errors. This implementation is considerably slower than the unrestricted version but will produce the same results as long as the recursive depth allowed is greater than or equal to the graph's diameter. A graph's diameter is defined as the number of edges in the longest shortest-path of the graph. This definition guarantees a finite diameter even in graphs with unconnected components. If the restricted recursive depth is shorter than the diameter the algorithm will fail, not being able to connect these components.

Accordingly, existing algorithms for determining connected components are variously inefficient, particularly with regard to graphs of relatively large diameter. Other connectivity-metrics include shortest paths, betweenness, clustering, and Steiner Tree. Techniques are also known for determining these connectivity-metrics, but they too are variously deficient for larger graphs.

Accordingly, what is needed are techniques for determining connectivity-metrics that are less computationally expensive than existing techniques, and that are more readily extensible to graphs of relatively large diameter.

SUMMARY OF THE INVENTION

The present invention provides fast bit-vector solutions for finding graph properties, with significant reduction of the computational time required as compared to conventional techniques.

According to one aspect, embodiments of the present invention determine a connectivity-metric for a graph representative of a network of interest. A graph that represents a network of interest is accessed. The graph includes nodes representing points in the network of interest, and edges corresponding to the nodes. Bit-vectors are generated corresponding to the nodes and/or edges, wherein individual bits in the bit-vectors respectively provide a logical indication of connectedness. The connectivity-metric is then determined by applying a logical bit operation to the plurality of bit-vectors.

One example of a connectivity-metric is a connected components determination. Determining the connectivity-metric for that example involves iteratively applying a bit-wise OR operation to bit-vectors that indicate connectedness between respective nodes. The number of iterations required until there is no additional change in the updated bit-vectors determines a measurement of connectivity (i.e., the diameter of the graph). The number and size of connected components are also evident from the updated bit-vectors.

Another example of a connectivity-metric is a shortest path determination. There, determining the connectivity-metric includes iteratively applying a bit-wise logical operation to the bit-vectors that indicate connectedness between respective nodes until the updated bit-vectors have no additional change. The distances between respective nodes are then determined by searching the updated bit-vectors, and the shortest path between nodes is determined based upon those distances.

In still another example the bit-vectors are edge bit-vectors, and the connectivity-metric is a betweenness determination. This metric is determined by iteratively applying a bit-wise logical operation to the bit-vectors that are coincident with the nodes of each edge to produce updated bit-vectors until there is no additional change.

In still another example, the connectivity-metric is a clustering determination, and determining the connectivity-metric uses the bit-vectors to determine a clustering coefficient of a clustering algorithm.

Various networks of interest may also be analyzed, including but not limited to social networks, transactional activity networks, and communications networks.

The present invention can be embodied in various forms, including business processes, computer implemented methods, computer program products, computer systems and networks, user interfaces, application programming interfaces, and the like.

BRIEF DESCRIPTION OF THE DRAWINGS

These and other more detailed and specific features of the present invention are more fully disclosed in the following specification, reference being had to the accompanying drawings, in which:

FIG. 6 is a schematic diagram illustrating a bit-vector table corresponding to the graph of FIG. 5 in accordance with the present invention.

FIG. 11 is a schematic diagram illustrating a bit-vector table corresponding to the graph of FIG. 10 in accordance with the present invention.

FIG. 13 is a schematic diagram illustrating a bit-vector table corresponding to the graph of FIG. 12 in accordance with the present invention.

FIG. 15 is a schematic diagram illustrating a bit-vector table corresponding to the graph of FIG. 14B in accordance with the present invention

DETAILED DESCRIPTION OF THE INVENTION

In the following description, for purposes of explanation, numerous details are set forth, such as flowcharts and system configurations, in order to provide an understanding of one or more embodiments of the present invention. However, it is and will be apparent to one skilled in the art that these specific details are not required in order to practice the present invention.

Figure 1:
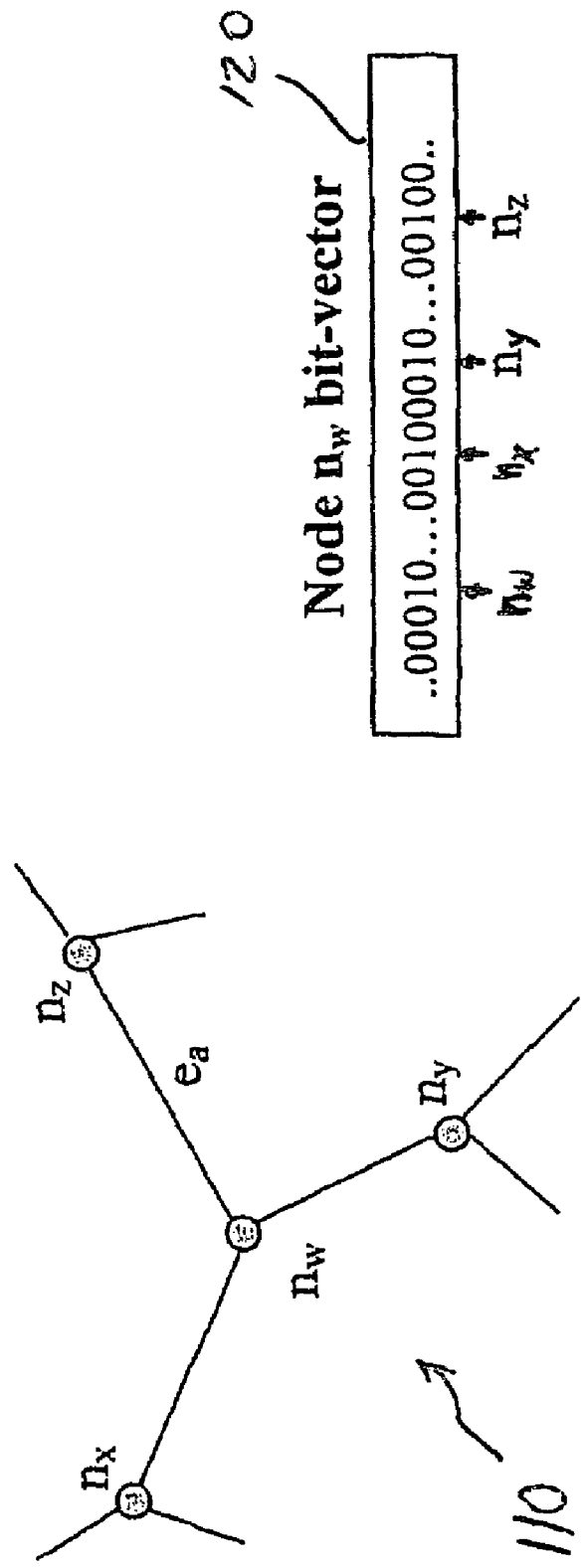
FIGS. 1 and 2 are schematic diagrams illustrating graphs with corresponding nodes and edges.

FIG. 1 is a schematic diagram depicting a graph 110 with nodes $n_w$-$n_z$ and a corresponding example of a bit node vector 120 in accordance with the present invention.

Bit-vectors are a distributed representation of an adjacency matrix commonly used to represent graphs. The bits in a bit-vector represent graph nodes, but the bit-vectors can represent either nodes or edges (e.g., edge $e_a$ connects nodes $n_w$ and $n_z$). A node bit-vector is simply a row from the graph's adjacency matrix. An edge bit-vector represents the nodes that are within some number of edges from a particular edge. Node bit-vectors, $v_n[n]_i$, are a distributed form of an adjacency matrix. The adjacency matrix is an n×n matrix. The first n represents a row and the n within the brackets represent the column. A given vector is represented in a row with the column values respectively representing the values in the vector. The variable i designates the number of iterations applied to the bit-vector. Each node bit-vector represents a particular graph node and its connectivity to all other graph nodes. Each bit position represents a node in the graph. A node's bit-vector has logical indications indicating connections to other nodes. Thus, there are "1" values for all nodes directly connected to this node, and "0" values in the absence of connections, as shown in FIG. 1.

Depending on the application, nodes can be considered reflexive (connected to themselves) or not. The examples described herein consider nodes to be reflexive, but the same principles of the present invention may be applied to non-reflexive nodes.

Figure 2:
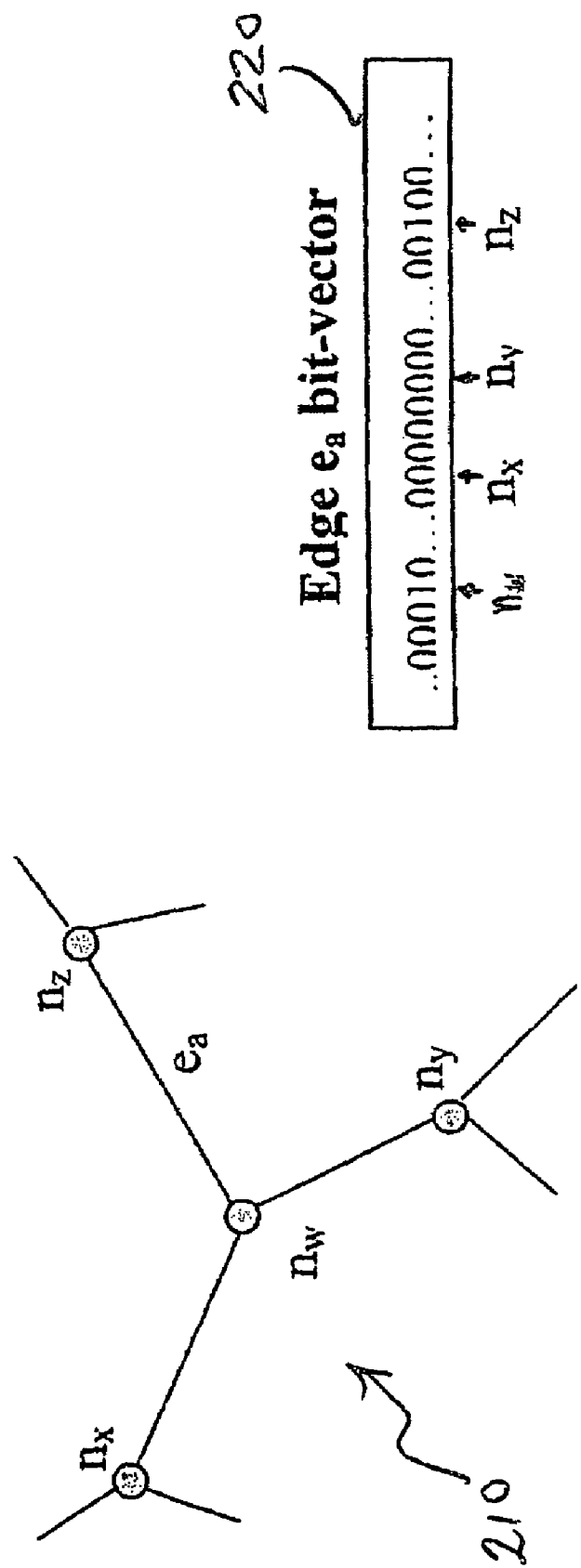

Edge bit-vectors, $e_n[n]_i$, represent an edge and the nodes that are connected by that edge. FIG. 2 is a graphical diagram illustrating an example of a graph 210 and corresponding edge bit vector 220. As with node bit-vectors, n designates a particular node index in the bit-vector and i designates the number of iterations applied to the bit-vector. Edge bit-vectors are edge-centric, not node-centric like node bit-vectors, but both provide unambiguous descriptions of a graph.

Before proceeding with further description of bit-vector algorithms for determining connectivity-metrics according to various aspects of the present invention, it is noted that it has been determined that the processing time required for the bit-vector algorithms is closely tied to a graph's diameter. Since it is expensive to find the diameter of a graph, for certain smaller groups traditional algorithms such as recursive algorithms will be more efficient. However, for the vast majority of potential networks of interest, it is believed that the bit-vector algorithms of the present invention will consume fewer computing resources, both in terms of calculation and memory.

The present invention is applicable to a variety of potential networks of interest, including but not limited to social networks, transactional networks and communications networks. The modeling of networks may also be variously provided. For example, social networks may be modeled using graphs that fit the "small world" model described in Newman, M. E. J., "Models of the Small World: A Review," (2000). Small world models, like co-authorship networks, are graphs where, typically, the average node degree is greater than 3 and the graph diameter is less than 20. Additional examples of networks of interest include Internet (domain level); movie actors; co-authorship, and a power grid. (See Albert, R. and A. L. Barabasi, "Statistical Mechanics of Computer Networks" (June 2001), for information including the average degree of such networks.)

Figure 3:
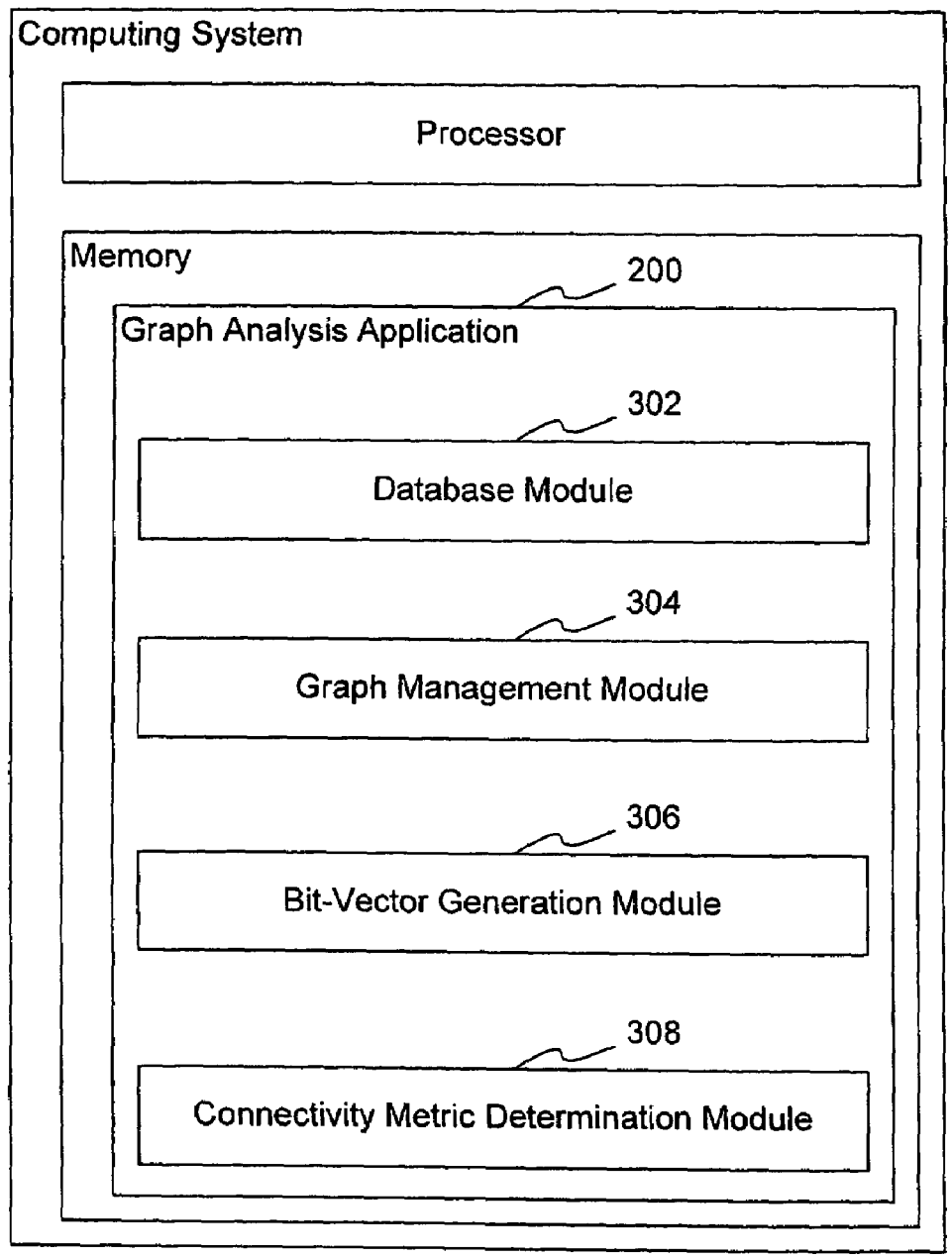
FIG. 3 is a block diagram illustrating a graph analysis application in accordance with the present invention.

FIG. 3 is a block diagram illustrating an example of a graph analysis application 300 in accordance with the present invention.

The graph analysis application 300 runs on a conventional operating system in memory and carries out the described functionality by execution of computer instructions. The application 300 may make use of various execution platforms, including but not limited to those implementing Java™ applets. The artisan will readily recognize the various alternative programming languages and execution platforms that are and will become available, and the present invention is not limited to any specific execution environment.

Although the graph analysis application 300 is preferably provided as software, it may alternatively be hardware, firmware, or any combination of software, hardware and firmware. Although one modular breakdown is described, such is provided by way of example only, as the functionality of the graph analysis application 300 may be provided in any number of alternative designs having greater, fewer or differently named component modules.

In one embodiment, a computer system includes the graph analysis application 300 resident in memory on a conventional computer system, with the graph analysis application 300 including instructions that are executed by a processor. Alternative embodiments include an article of manufacture wherein the instructions are stored on a computer readable storage medium. The medium may be of any type, including but not limited to magnetic storage media (e.g., floppy disks, hard disks), optical storage media (e.g., CD, DVD), and others. Still other embodiments include computer implemented processes described in connection with the graph analysis application 300 as well as the corresponding flow diagram and other figures.

The graph analysis application 300 includes a database module 302, a graph management module 304, a bit-vector generation module 306, and a connectivity-metric determination module 308.

The database module 302 stores and maintains information corresponding to a network of interest. Examples include but are not limited to a company e-mail database, a journal bibliography for authors that co-author papers, social networks, etc. Although the database module 302 is shown to reside within the graph analysis application 300, it should be understood that a large database may be separately stored for access by the graph analysis application 300, and as such the illustration is merely to indicate that the data is accessible by the graph access application 300. Also, the database may be variously accessible, such as through a network.

The graph management module 304 accesses and maintains graph data for a currently analyzed network of interest. In that regard, the graph management module 304 accesses information in the database module 302 and organizes and maintains the nodes and connections between nodes for a graph corresponding to the network of interest. The graph data corresponds to any network of interest for which graph information is available or extractable. Conventional techniques may be used to extract a graph from a given network, depending upon how the information is stored. For example, a graph is extracted from a database of e-mails by identifying the addresses for the various senders and recipients, and building the graph accordingly.

The bit-vector generation module 306 is in communication with the graph management module 304 and thus accesses the graph information. The bit-vector generation module 306 generates a plurality of bit-vectors for the graph. These bit-vectors may include node bit-vectors and/or edge bit-vectors as previously described. The bit-vectors may be generated according to the technique described above, wherein logical one represents a connection and logical zero represents that absence of a connection for the respective elements of the node or edge bit-vectors.

The connectivity-metric determination module 308 determines connectivity-metrics for the graph representative of the network of interest. Preferably, this is accommodated by applying logical operations and other processing to the bit-vectors. This processing is described in further detail below, with regard to the various examples of connectivity-metrics. The connectivity-metrics include connected components, shortest path, betweenness, clustering, and tree-based determinations.

In addition to the described modules, the graph analysis application 300 includes conventional facilities for interfacing with the user, including but not limited to display as well as keyboard and cursor based input.

Figure 4:
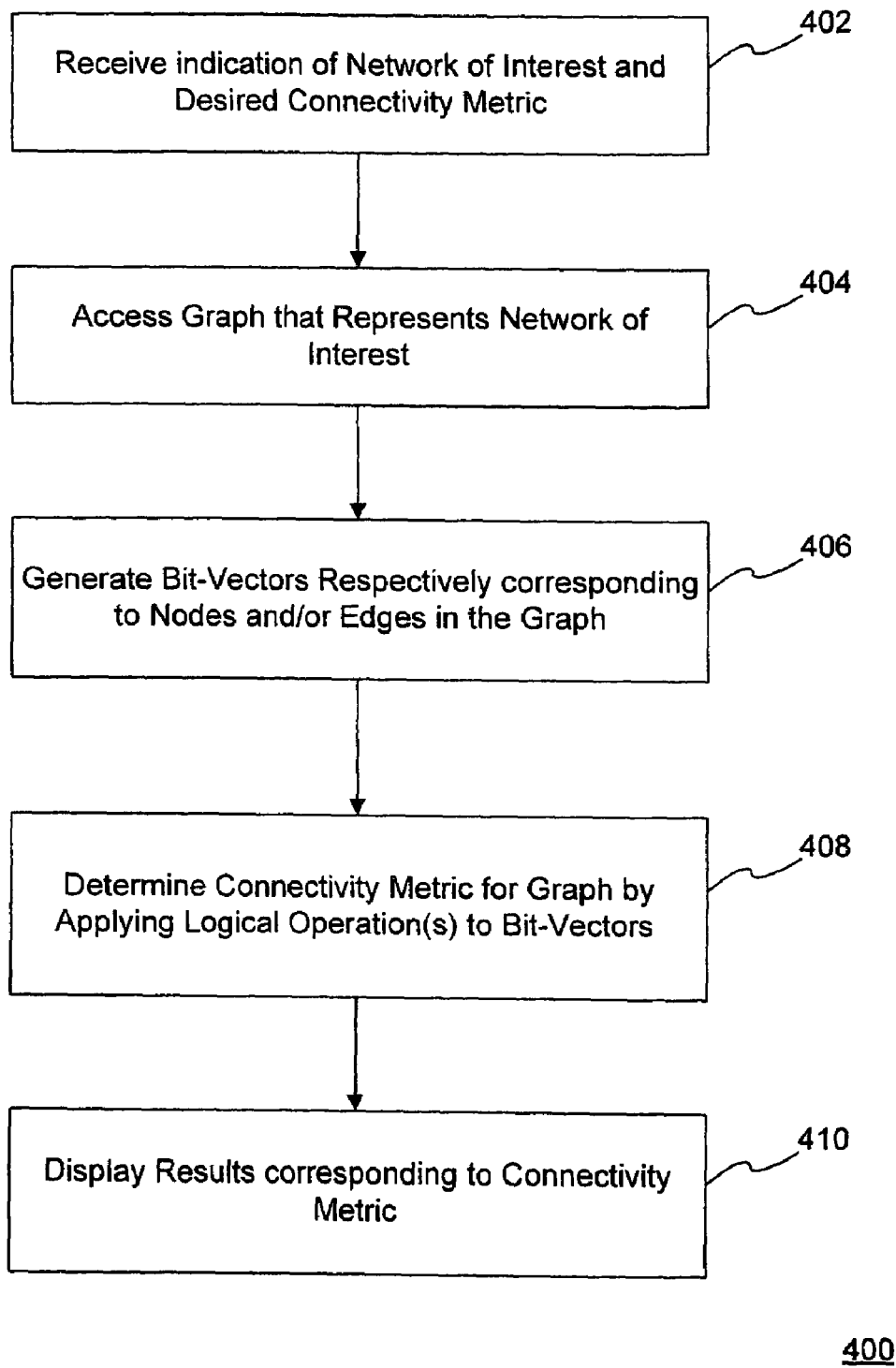
FIG. 4 is a flow diagram illustrating an example of determining connectivity-metrics using bit-vectors in accordance with the present invention.

FIG. 4 is a flow diagram illustrating a process 400 for determining a connectivity-metric using bit-vectors in accordance with the present invention. The process 400 commences with receipt 402 of an indication of the network of interest and desired connectivity-metric. This may be accommodated through conventional user interfaces for displaying and receiving user input. The user may select from among various databases/networks of interest, and may also select from among the various connectivity-metric types described herein.

The graph that represents the network of interest is then accessed 404, such as through access to the data in the above-described database. The graph may be represented in the form of data that defines the nodes and connections between the nodes.

Bit-vectors respectively corresponding to the nodes and/or edges in the graph are then generated 406. The determination of the type of bit-vector to generate may be contingent upon the desired type of connectivity-metric, as will be understood from the descriptions below.

The selected connectivity-metric for the graph is determined 408 by processing the bit-vectors. This processing may include various operations, preferably including at least one logical operation. The processing may be an iterative, such that updated bit-vectors corresponding to the graph are generated based upon previous iterations, or combinations of previously generated bit-vectors. The various processing of the bit-vectors for the different types of connectivity-metrics is described further below.

Once the calculations have been completed, the results are displayed 410 for the user, again using common techniques for interfacing with the user.

The various examples of bit-vector generation and corresponding connectivity-metric determination performed by the graph analysis application 300 are further described as follows.

Connected Components

A connected component of a graph is a sub-graph of nodes that are connected to each other by at least one edge. Because no connectivity exists across connected components, these sub-graphs can be isolated for subsequent analysis. In social network analysis, for example, the number and size of connected components can be used to characterize the relationships represented by a graph.

For relatively large graphs, the bit-vector algorithm of the present invention is more robust and more efficient than conventional recursive algorithms for determining connected components.

Figure 5:
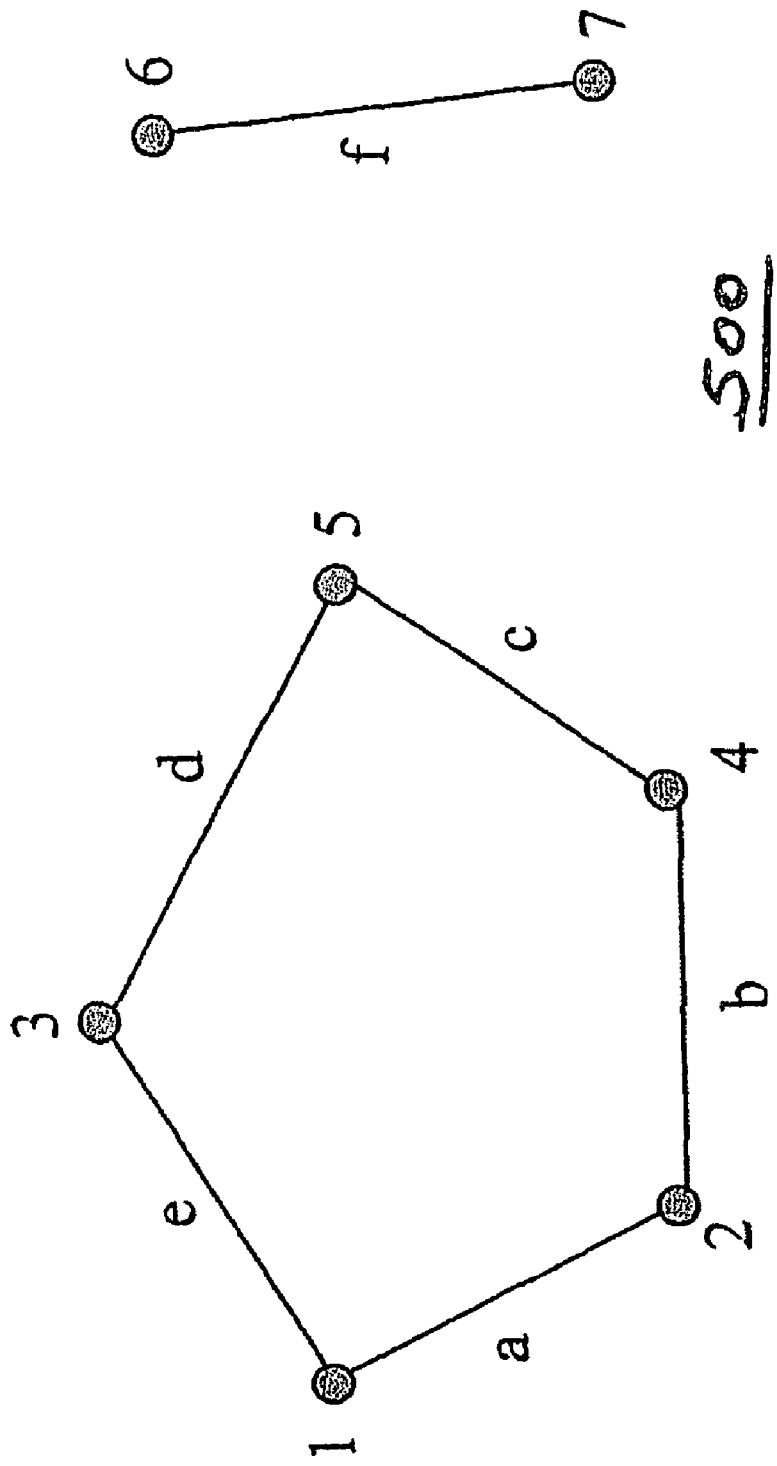
FIG. 5 is a schematic diagram illustrating a two component graph.
Figure 7:
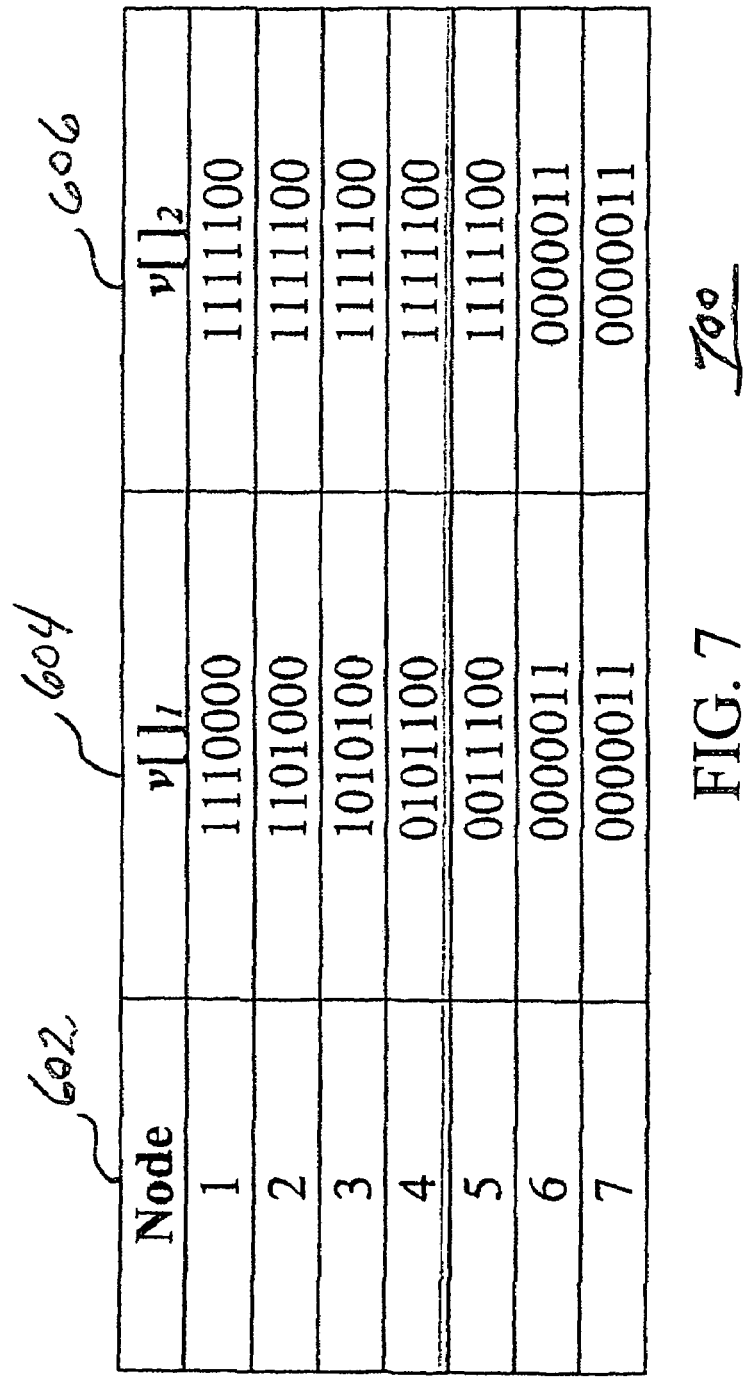
FIG. 7 is a schematic diagram illustrating another bit-vector table corresponding to the graph of FIG. 5 in accordance with the present invention.

FIG. 5 is a graphical diagram illustrating a simple two-component graph 500, and the corresponding node bit-vectors are shown in the bit-vector table 600 of FIG. 6, which contains a column 602 for the nodes and a corresponding column 604 for the respective bit-vectors for those nodes. Using the bit-vectors in FIG. 6 as a starting point ($v[\ ]_1$), the next step for each node's bit-vector is the bit-wise OR of all the bit-vectors with a "1" value in the first step ($v[\ ]_1$,). For example, the Node 1 bit-vector has a "1" for Nodes 1, 2, and 3, so the $v[\ ]_2$ value is the bit-wise OR of the first step ($v[\ ]_1$) vectors from Node 1, 2 and 3, which provides the $v[\ ]_2$ bit mode vector 1111100. The resultant bit-vector table 700 is shown in FIG. 7, which shows the previously described columns for the nodes 602 and first bit-vector 604, as well as a column 606 for the resulting bit-vector $v[\ ]_2$ for each node.

This OR process continues until the bit-vectors stop changing, which in this simple example happens in $v[\ ]_2$. The two different vector values in $v[\ ]_2$ represent the two components and show which nodes belong to each component. Because the process stops in $v[\ ]_2$, the diameter of this graph is also now known to be two.

Figure 8:
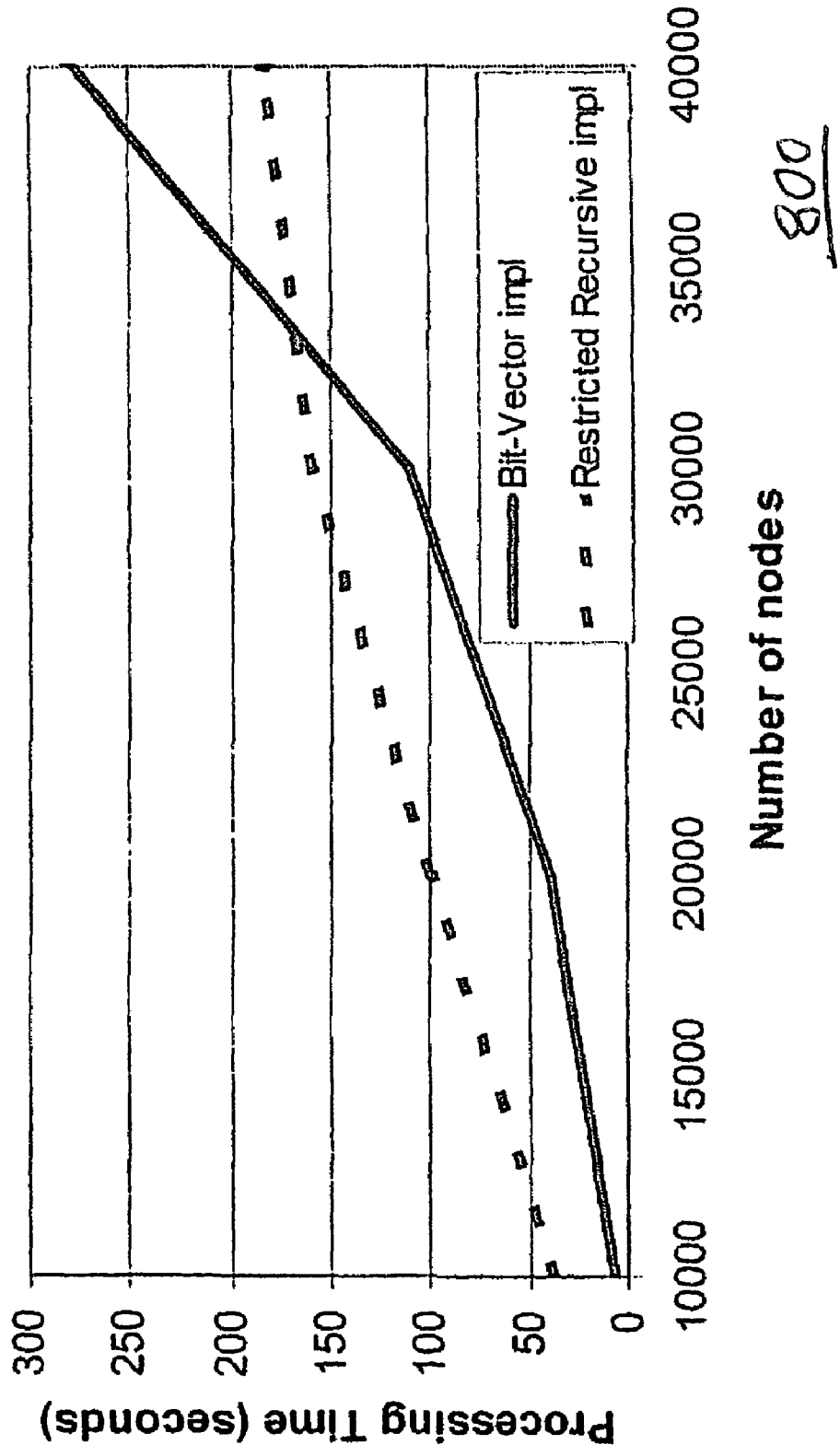
FIGS. 8 and 9 are graphical diagrams illustrating an example of the performance of bit-vector based determination of connectivity-metrics.
Figure 9:
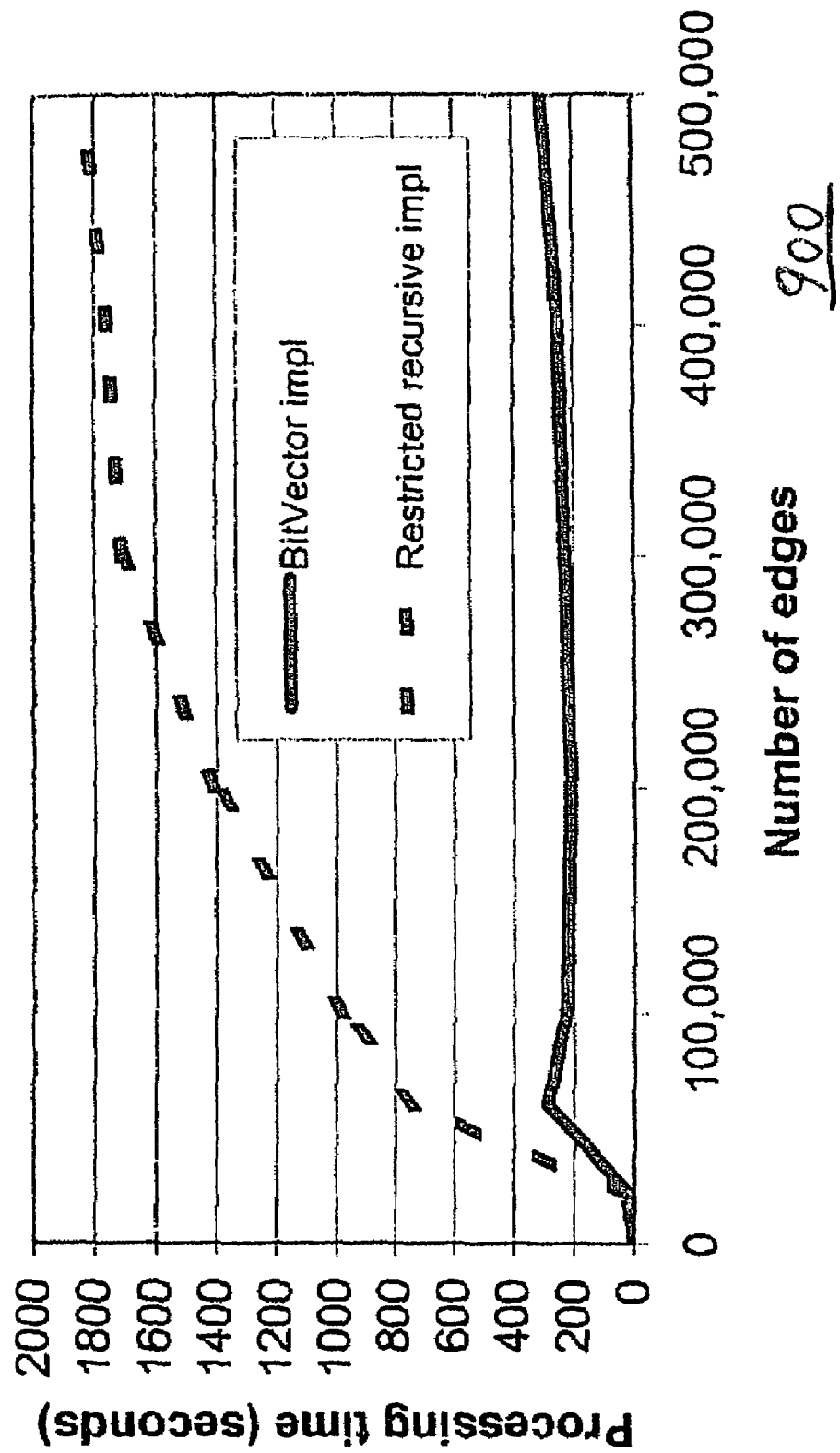

The unrestricted recursive algorithm is much faster than either the restricted recursive or bit-vector algorithms, but it is limited to small graphs. The performance times of the restricted recursive and bit-vector algorithms are compared in FIG. 8 and FIG. 9. Random graphs were generated to review expected performance. Random graphs were used because they can be quickly generated, and because they model some, though obviously not all, networks of interest. Random graphs are also useful for illustrating effectiveness because they can be characterized by their average degree (average number of edges incident on graph nodes) and their diameter (length of the longest shortest-path in the graph). FIG. 8 is a graph 800 illustrating how increasing the number of nodes (with the number of edges fixed) affects execution time. FIG. 9 is a graph 900 illustrating how changing only the number of edges affects execution time.

FIG. 8 shows that the bit-vector algorithm is approximately 5 times faster than the restricted recursive algorithm at 10,000 nodes (with 30,000 edges). As the number of nodes is increased, however, the advantage of the bit-vector algorithm is decreased. However, graphs with 30,000 edges and more than 30,000 nodes are typically of lesser interest because the graph connectivity is too low to model social networks. FIG.

9 also shows a peak in the performance time of the bit-vector algorithm at approximately 60,000 edges. This peak is consistent with the sensitivity of bit-vector performance to a graph's diameter, and is expected because the number of iterations required for the bit-vector algorithm is directly linked to the diameter. Although individual experiments may of course vary, FIGS. 8 and 9 show that for random graphs that have similar properties to social networks, the bit-vector algorithm for connected components may be expected to be between 2 and 9 times faster than the restricted recursive algorithm.

All Pairs Shortest Paths

"Shortest paths" is another common connectivity-metric. One conventional algorithm for finding the shortest path from all nodes in a graph to all other nodes is known as Floyd-Warshall's (F-W) algorithm.

The F-W algorithm is a simple algorithm that operates on two $N_n^2$ arrays of integers. One is the Distance matrix, $D[N_n][N_n]$, and the other is the Intermediate matrix, $I[N_n][N_n]$. At the completion of the algorithm the Distance matrix will contain the distance from any node x to any other node y, $D[x][y]$, and the Intermediate matrix will contain the path to take from node x to node y through the intermediate node k, $k=I[x][y]$.

D[ ][ ] is initialized as follows:

```
D[x][y]   = the weight of edge <x,p if it exists (can be negative),
          = 0, if x=y, and
          = MaxInt (effectively infinity) for all other entries.
I[ ][ ] is initialized as follows:
I[x][y]   = x, if<x,y> exists,
          = 0, otherwise.
```

The F-W algorithm proceeds as follows:

```
for (k=1; k<=numberOfNodes; k++) {
    for (i= 1; i<=numberOfNodes; i++) {
        for (j=1 ; j<=numberOfHodes; j++) {
            temp = D[i][k] +D[k][j];
            if (temp < D[i][j]) {
                D[i][j] = temp;
                I[i][j] = I[k][j];
            }
        }
    }
}
```

A problem with the F-W algorithm is that it requires two $N_n^2$ arrays of integers. These arrays are too large for typical application memory constraints, such as Java application memory, when $N_n$ is very large. The bit-vector shortest path determination according to this aspect of the present invention mitigates the memory problem. The bit-vector algorithm begins with the same expansion steps that were used to find connected components, as described above. As with connected components, expansion is continued until the bit-vectors stop changing.

The distance from node x to node y can be found by searching $v[x]_n$ from n=1, incrementing n until bit y in $v[x]_n$ is ON. The distance from x to y is then n. Of course, if x is the same as y, the distance is zero. Unlike the F-W algorithm, where the distance can be immediately found in D[x][y], the bit-vector algorithm requires a search, but can handle much larger graphs.

Finding the shortest path from node x to node y is a bit more complex. This is accomplished by initially finding the distance $d_{xy}$ between these nodes as explained above. The following steps find the shortest path from x to y:

```
int nextstep = x;
int destination = y;
for (int n = d_xy -1; n > 0; n--) {
    // 'nextSetBit' returns the bit number that
    // is ON in the resulting vector
    bTemp = v[nextStep]_1 AND v[destination]_n ;
    nextstep = bTemp.nextSetBit(0);
    // nextstep now has the next node number in the path from x to y
}
```

Betweenness

Clustering algorithms are used to find groups of nodes that are highly interconnected. The concept of betweenness has been introduced as a more global measure of a node's involvement in a network of interactions. Clustering algorithms generally use information from the local neighborhood of a node to identify clusters. Betweenness, on the other hand, determines the centrality of paths within a network and ranks nodes based on the paths that pass through them.

The best-connected scientist (BCS) algorithm was described in a work by Newman, M. E. J., "Who is the Best Connected Scientist? A study of scientific co-authorship networks," (June 2001). The BCS algorithm can be described with the following analogy. Envision the co-authorship graph as a roadmap, where each author is a town (node) and the papers they co-authored are the roads (edges) connecting the towns. The distance between any two towns on a particular road is the number of authors for the paper represented by that road. This means that papers with only a few authors are represented as shorter roads, representing the closer ties that are likely to exist among smaller groups. Papers with only one author are ignored because they do not represent connections within the community.

Using this roadmap analogy, if each town begins with a population equal to the number of towns and each person in each town travels to a unique destination town always using the shortest path, then the best-connected town will be the town with the most travelers entering it, although it is arbitrary whether the traveler is tallied when entering or leaving the town.

It is important to understand the difference between connectedness and betweenness. Although the BCS algorithm's name includes the word "connected", it is really measuring betweenness. Authors ranked highly by the BCS algorithm are sometimes not directly connected to many people. Instead, they often act as a bridge or conduit between groups that are internally highly connected, but go through the conduit to get to other groups.

Figure 10:
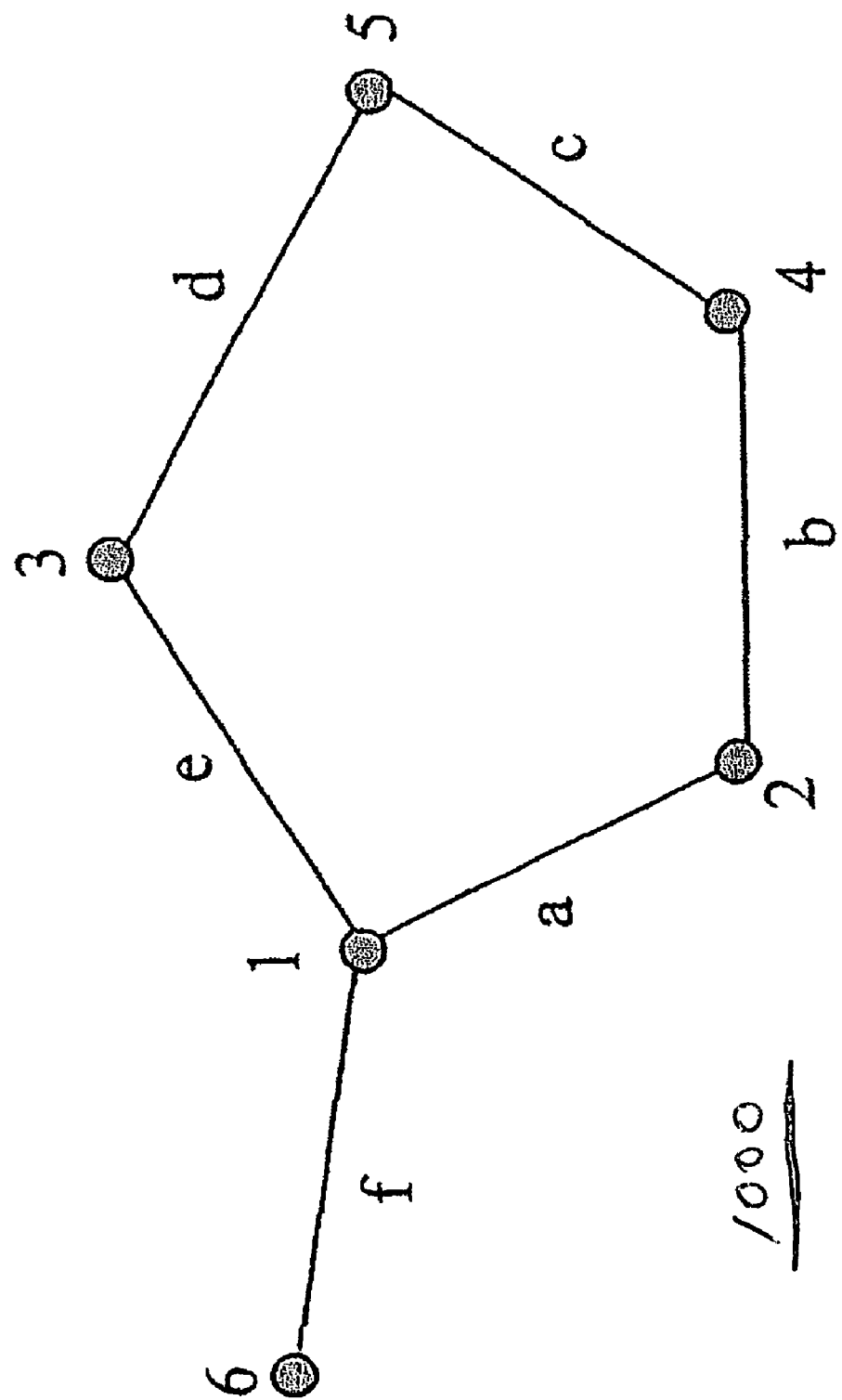
FIG. 10 is a schematic diagram illustrating another example of a graph with corresponding nodes and edges.

The bit-vector implementation of the BCS algorithm according to this aspect of the present invention uses an edge bit-vector representation as described above. As an example, consider the graph 1000 in FIG. 10 (containing nodes 1-6 and edges a-f) and its corresponding edge bit-vectors in column e[ ]$_1$ (1104) of the bit-vector table 1100 illustrated in FIG. 11.

The algorithm proceeds from e[ ]$_n$ to e[ ]$_{n+1}$ by applying a logical OR operation to all of the edge bit-vectors coincident with the end nodes of each edge. For example, edge a has end nodes 1 and 2. Edges e and f are also coincident with node 1 and edge b is also coincident with node 2. Therefore, for edge a: $e_a[\ ]_n$ OR $e_e[\ ]_n$ OR $e_f[\ ]_n$ OR $e_b[\ ]_n$. This process continues until all of the bit-vectors stop changing (that is, e[ ]$_n$=e[ ]$_{n+1}$). In the illustrated example, this condition would be represented where e[ ]$_5$ would be equal to e[ ]$_4$.

As illustrated in the bit-vector table 1100, there are columns for four bit-vectors 1104, 1106, 1108, 1110 corresponding to the nodes (1102). As can be seen, all of the edge bit-vectors are coincident with the end nodes of each edge at e[ ]$_4$.

Because information about the graph's connectivity spreads with each step in this process, the shortest paths and BCS tallies are done in the same pass. This factor and the fast OR operations provide for efficient determinations. The bit-vector BCS algorithm has been determined to be significantly better than traditional implementations in analysis of experimental results.

Clustering

Clustering algorithms are used in graph analysis to measure the level of connectivity within a graph. These algorithms can be used to measure the global (or average) connectivity across an entire graph or the local connectivity to find regions of a graph that are more or less densely connected than the rest of the graph.

The example of a clustering algorithm to be calculated using the bit-vectors implements the clustering coefficient (C) defined by Equation 1. The clustering coefficient is three times the number of fully connected groups of three nodes (triangles) divided by all possible triples (nodes that are directly connected to two distinct other nodes).

$$C = \frac{3 * (\# \text{ triangles})}{\# \text{ triples}} \quad \text{Eq. 1}$$

Figure 12:
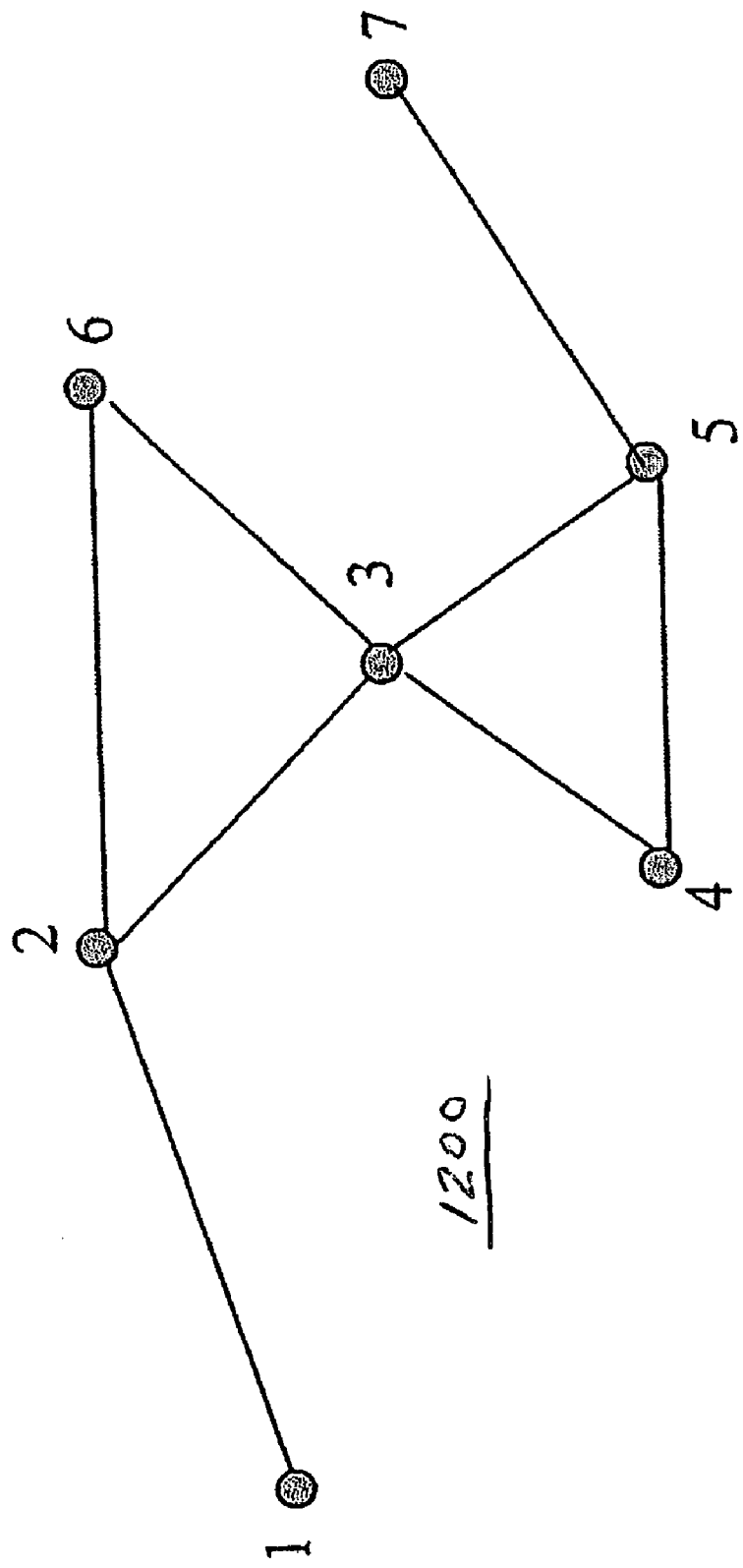
FIG. 12 is a schematic diagram illustrating another example of a graph with corresponding nodes and edges.

Consider the graph 1200 shown in FIG. 12, which illustrates nodes 1-7 and related edges. By inspection, this graph has two triangles (▲236 and ▲345). The number of triples can be found by summing $$\binom{n_i}{m}$$

for each node, where n is the number of other nodes connected to node i and m is the number of other nodes required to make a triangle (therefore m=2). The result is shown in Equation 2.

$$\text{If } ni \geq m \text{ and } m = 2 \quad \binom{n_i}{m} = \frac{n_i!}{m!(n_i - m)!} = \frac{n_i(n_i - 1)}{2},$$

$$\text{Otherwise} \quad \binom{n_i}{m} = 0$$

Finding $$\sum \binom{n_i}{m}$$

for all nodes in FIG. 14 proceeds:

$$n_1 = 1, \text{ so } \binom{n_i}{m} = 0, \quad \text{Eq. 2}$$

-continued $$n_2 = 3, \text{ so } \binom{n_i}{m} = 3,$$

$$n_3 = 4, \text{ so } \binom{n_i}{m} = 6,$$

$$n_4 = 2, \text{ so } \binom{n_i}{m} = 1,$$

$$n_5 = 3, \text{ so } \binom{n_i}{m} = 3,$$

$$n_6 = 2, \text{ so } \binom{n_i}{m} = 1,$$

$$n_7 = 1, \text{ so } \binom{n_i}{m} = 0,$$

summing to 14

Therefore, according to Equation 1, C=3(2)/14=3/7.

The bit-vector representation is used to calculate the clustering coefficient as follows. From the graph in FIG. 12, the node bit-vectors v[ ]1 are generated as shown in the bit-vector table 1300 of FIG. 13, which identifies the nodes 1302 and corresponding bit-vectors 1304.

$$\sum \binom{n_i}{m}$$

is used as before to find the number of triples. From the bit-vector representation the number of nodes directly connected to each node is the cardinality of the bit-vector for that node minus 1 (represented as cardinality(n$_i$[ ]$_1$)−1).

The number of triangle nodes can be found by using the following Java-like algorithm:

```
// array of bit-vectors are assumed initialized prior to this code
BitSet n[ ], temp;
// triangleNodes contains the answer when this code completes
triangleNodes = 0;
// loop thru all nodes (assume nodes are numbered 1 ..numberOfNodes)
for (int i=1 ; i<=numberOfNodes; i++) {
    if (n[i].cardinality( ) > 1) { // only bother if node has neighbors
        for (int j=i+1; j<=numberOfNodes; j++) {
            temp = n[i].clone( );
            card_ij = temp.AND(n[j]).cardinality( );
            if (card_ij >= 3) {
                triangleNodes += card-ij − 2;
            }
        }
    }
}
```

This code uses the cardinality( ), clone( ), and and( ) methods that can be performed on Java BitSet objects to find connected pairs of nodes that share other common nodes, forming triangles. The clustering coefficient can then be found by dividing the number of triangle nodes by the number of triples, as shown in Equation 3.

$$C = \frac{triangleNodes}{\# \text{ triples}} \qquad \text{Eq. 3}$$

Tree-Based Connectivity-Metric Determination

Steiner Tree is the lowest cost tree that connects all of a set of pre-selected terminal nodes. Finding Steiner Trees is a classic graph analysis problem because it requires global optimization and, like the Traveling Salesman Problem, has many practical applications.

Finding a Steiner Tree for a given set of pre-selected nodes in a given graph can be solved in polynomial time in cases where two, three, or all nodes are terminal nodes.

Unlike finding a shortest path between nodes, a Steiner Tree minimizes the link cost required to connect the terminal nodes and is not, in general, the same as the shortest paths.

Figure 14A:
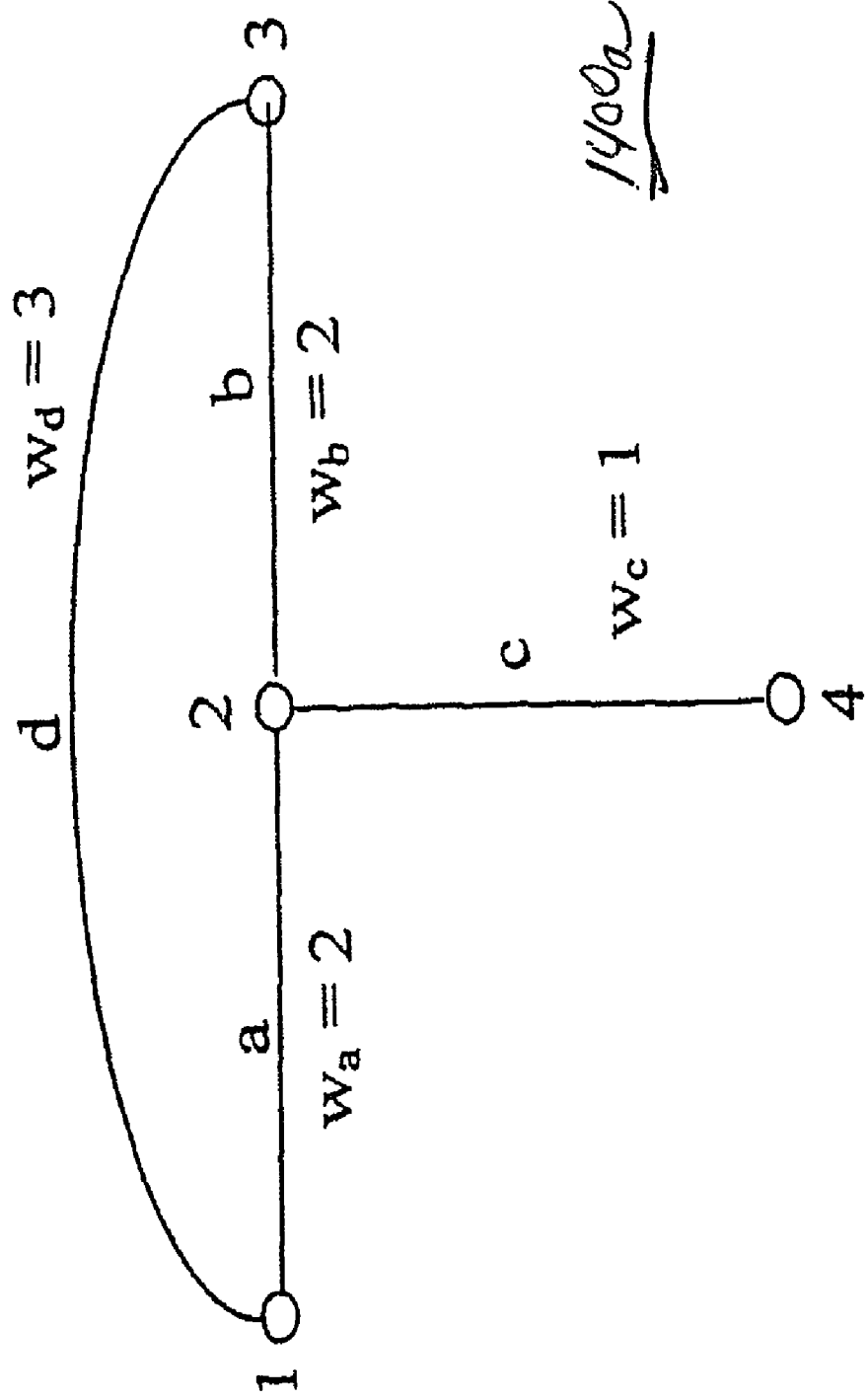
FIGS. 14A-B are schematic diagrams illustrating still other examples of graphs with corresponding nodes and edges, in relation to a Steiner Tree application of the present invention.

FIG. 14A shows a simple example graph 1400a that demonstrates how a Steiner Tree may not include a shortest path. The graph includes nodes 1-4. The weight (or cost) of each edge is indicated by $w_{a\text{-}d}$.

If nodes 1, 2, 3, and 4 in the graph 1400a are terminal nodes, then the Steiner Tree contains edges a, b, and c with a total cost of 5, not link d (which is the shortest path between nodes 1 and 3).

Figure 14B:
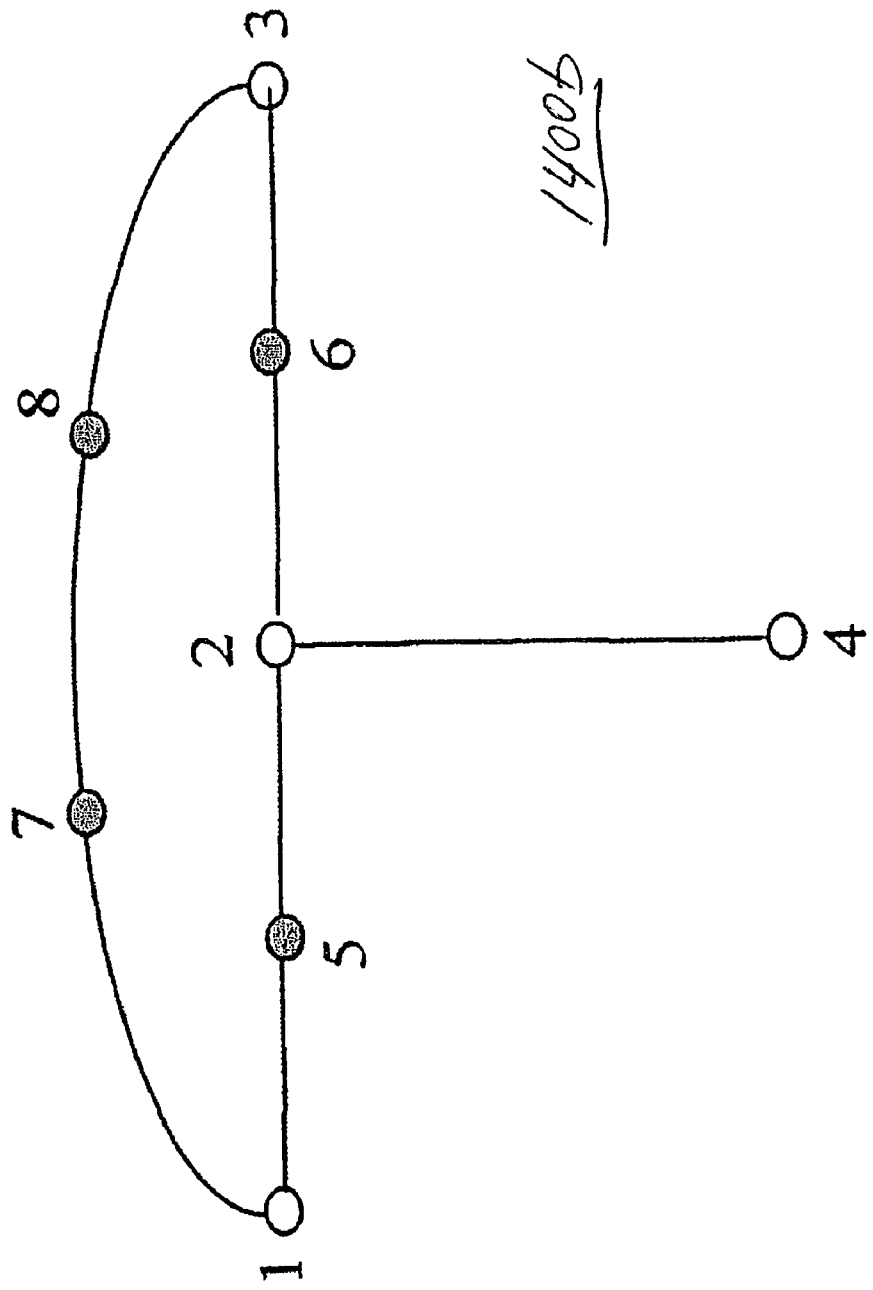

To find a Steiner Tree using bit-vectors, the link weights are discretized and replaced with a series of un-weighted links, as shown in the graph 1400b in FIG. 14B are shown in the bit-vector table 1500 shown in FIG. 15, which denotes the nodes (column 1502) and corresponding bit-vectors (columns 1504, 1506). For graphs with un-weighted links or links that are already discrete, bit-vectors can find an exact Steiner Tree solution. For graphs with continuously weighted links, the solution will be an approximation.

The bit-vector algorithm starts with a node bit-vector representation of the discretized un-weighted graph. The bit-vectors for the graph in FIG. 14B are shown in FIG. 15. Each node's bit-vector is then logical OR'd with the bit-vectors of other nodes that are connected to that node. This process is repeated, expanding the neighborhood of each node, until one node has all of the terminal nodes as 1's in its vector. This node represents the "center of mass" for the terminal nodes. The steps of this process are reflected in the bit-vector table 1500. Nodes 2 and 4 both reach the end condition with 1's for nodes 1, 2, 3, and 4 in v[ ]$_2$ (column 1506). Either node can be selected for the next step.

The nodes with 1's in v[ ]$_2$ and their interconnecting edges are referred to as the Super Steiner Tree, because these nodes and edges are a super-set of the desired Steiner Tree. These additional nodes and edges are pruned in the next step.

The Super Steiner Tree is pruned by finding the shortest path from each terminal node to its nearest neighbor terminal node, according to the shortest path technique described above, and keeping track of which nodes and edges are traversed in the process. Any nodes and edges not traversed by the end of this process are then pruned, leaving the Steiner Tree. In the example from FIG. 18, no pruning is required. The resulting Steiner Tree includes Nodes 1, 2, 3, and 4 with Nodes 5 and 6 as Steiner nodes.

The Steiner Tree will include all the original terminal nodes, additional nodes needed to interconnect the original terminal nodes (these additional nodes are called Steiner nodes), and the minimum edges required. All tie solutions will be included using this process. Ties can be found by searching the resulting Steiner Tree for cycles.

Only connected graphs can contain a Steiner Tree. For this reason a test should be included that stops the algorithm when the graph's diameter is discovered before all terminal nodes are encountered.

The complexity of finding the Super Steiner Tree is similar to that of the connected component algorithm where the maximum distance between any two terminal nodes is considered the diameter. The complexity of the pruning step is $O(n^2)$ where n is the number of terminal nodes.

For those embodiments using Java applets, the bit-vector implementation may use the BitSet object supported by the Java JDK. Bit-vectors offer significant speed improvements over standard algorithm implementations because many iterative node-by-node operations are replaced by faster logical bit operations.

The various bit-vector implementations also scale up well to large graphs, especially "small world" social-network type graphs that are highly clustered with small diameters.

Bit-vectors can be easily adapted to applications with un-directed and un-weighted graphs. Directed graphs can also be represented by only putting 1's in source node bit-vectors. Finally, weighted graphs can be represented as shown in the discussion on Steiner Trees.

Thus embodiments of the present invention accommodate the determination of connectivity-metrics using bit-vectors. Although the present invention has been described in considerable detail with reference to certain embodiments thereof, the invention may be variously embodied without departing from the spirit or scope of the invention. Therefore, the following claims should not be limited to the description of the embodiments contained herein in any way.

The invention claimed is:

1. A method for determining a connectivity-metric for a graph representative of a network of interest, the method comprising:

Accessing a graph that represents a network of interest, the graph comprising a plurality of nodes representing points in the network of interest and a plurality of edges corresponding to the plurality of nodes;

generating a plurality of bit-vectors respectively corresponding to at least one of the plurality of nodes or the plurality of edges, wherein individual bits in the bit vectors respectively provide a logical indication of connectedness to each other node or edge;

determining the connectivity-metric by applying, for each bit-vector, a bit-wise OR with each other bit-vector of the plurality of bit-vectors that has a positive indication of connectedness to the first bit-vector to create a plurality of updated bit-vectors;

iteratively applying, for each updated bit-vector, the bit-wise OR with each other updated bit-vector of the plurality of updated bit-vectors until there is no additional change in the plurality of updated bit vectors;

determining the connectivity metric by using the updated bit vectors;

wherein the accessing, generating, and determining steps are performed on at least one particular machine, said at least one particular machine comprising at least one physical computing device.

2. The method of claim 1, wherein the connectivity-metric is a connected components determination and the connectivity metric is determined by counting the iterations used until there are no additional changes in the plurality of updated bit-vectors.

3. The method of claim 1, wherein the connectivity metric is a shortest path determination and determining the connectivity-metric further comprises:

determining distances between respective nodes by searching the plurality of updated bit-vectors; and
determining a shortest path between nodes based upon the determined distances.

4. The method of claim 1, wherein the plurality of bit-vectors are edge bit-vectors and the connectivity-metric is a betweenness determination.

5. The method of claim 1, wherein the network of interest is a social network.

6. The method of claim 1, wherein the network of interest is one of a social network, a transactional activity network, or a communications network.

7. A system for determining a connectivity-metric for a graph representative of a network of interest, the system comprising:
At least one particular machine, said at least one particular machine comprising at least one physical computing device; wherein the at least one particular machine accesses a graph that represents a network of interest, the graph comprising a plurality of nodes representing points in the network of interest, and a plurality of edges corresponding to the plurality of nodes;
A plurality of bit-vectors respectively corresponding to at least one of the plurality of nodes or the plurality of edges, wherein individual bits in the bit-vectors respectively provide a logical indication of connectedness to each other node or edge, the plurality of bit-vectors being generated by the at least one particular machine; and
determining the connectivity-metric by applying, for each bit-vector, a bit-wise OR with each other bit-vector of the plurality of bit-vectors that has a positive indication of connectedness to the first bit-vector to create a plurality of updated bit-vectors;
iteratively applying, for each updated bit-vector, the bit-wise OR with each other updated bit-vector of the plurality of updated bit-vectors until there is no additional change in the plurality of updated bit vectors;
determining the connectivity metric by using the updated bit vectors.

8. The system of claim 7, wherein the connectivity-metric is a connected components determination and the connectivity metric is determined by counting the iterations used until there are no additional changes in the plurality of updated bit-vectors.

9. The system of claim 7, wherein the connectivity-metric is a shortest path determination, and determining the connectivity metric further comprises:
determining distances between respective nodes by searching the plurality of updated bit-vectors; and
determining a shortest path between nodes based upon the determined distances.

10. The system of claim 7, wherein the plurality of bit vectors are edge bit-vectors, and the connectivity-metric is a betweenness determination.

11. An apparatus for determining a connectivity-metric for a graph representative of a network of interest, the apparatus comprising:
A graph management module, which accesses a graph that represents a network of interest, the graph comprising a plurality of nodes representing points in the network interest, and a plurality of edges corresponding to the plurality of nodes;
A bit-vector generation module, in communication with the graph management module, which generates a plurality of bit-vectors respectively corresponding to at least one of the plurality of nodes or the plurality of edges, wherein individual bits in the bit-vectors respectively provide a logical indication of connectedness;
a connectivity-metric determination module, in communication with the bit-vector generation module, which determines the connectivity metric by applying, for each bit-vector, a bit-wise OR with each other bit-vector of the plurality of bit-vectors that has a positive indication of connectedness to the first bit-vector to create a plurality of updated bit-vectors;
iteratively applying, for each updated bit-vector, the bit-wise OR with each other updated bit-vector of the plurality of updated bit-vectors until there is no additional change in the plurality of updated bit vectors;
determining the connectivity metric by using the updated bit vectors; and
wherein the graph management module, the bit vector generation module, and the connectivity-metric determination module are executed on at least one particular machine, said at least one particular machine comprising at least one physical computing device.

12. The apparatus of claim 11, wherein the connectivity-metric is a connected components determination, wherein the connectivity-metric determination module determines the connectivity metric by counting the iterations used until there are no additional changes in the plurality of bit vectors.

13. The apparatus of claim 11, wherein the connectivity-metric is a shortest path determination, and the connectivity-metric determination module determines distances between respective nodes by searching the plurality of updated bit-vectors, and determines a shortest path between nodes based upon the determined distance.

14. The apparatus of claim 11, wherein the plurality of bit vectors are edge bit-vectors and the connectivity metric is a betweenness determination.

* * * * *